United States Patent
Sterling et al.

(10) Patent No.: US 6,715,194 B1
(45) Date of Patent: Apr. 6, 2004

(54) BLADE REMOVING TOOL FOR ROTARY LAWN MOWERS

(76) Inventors: Kevin R. Sterling, 16315 SE. 92nd Ave., Summerfield, FL (US) 34491; Laurence E. Holstein, 4606 S. Gid Hall Point, Inverness, FL (US) 34452

( * ) Notice: Subject to any disclaimer, the term of this patent is extended or adjusted under 35 U.S.C. 154(b) by 0 days.

(21) Appl. No.: 10/163,250

(22) Filed: Jun. 5, 2002

(51) Int. Cl.[7] .................................................. B23Q 3/00
(52) U.S. Cl. ........................................ 29/281.1; 29/283
(58) Field of Search .............................. 29/281.1, 281.5, 29/283, 240, 267, 270; 76/82.1; 254/17, 131, 15; 248/228, 231.7; 451/371

(56) References Cited

U.S. PATENT DOCUMENTS

| | | | | |
|---|---|---|---|---|
| 4,564,991 A | * | 1/1986 | Taylor | 29/283 |
| 4,882,960 A | * | 11/1989 | Kugler | 29/283 |
| 4,956,905 A | * | 9/1990 | Davidson | 29/281.1 |
| 5,865,018 A | * | 2/1999 | Wanie | 29/283 |

* cited by examiner

*Primary Examiner*—Robert C. Watson
(74) *Attorney, Agent, or Firm*—Edward P. Dutkiewicz

(57) ABSTRACT

A blade removing tool for rotary lawn mowers includes a central support assembly forming a guide adapted to be positioned over a bolt holding a rotary lawn mower blade in position and to allow the passage of a socket wrench there through. An elongated handle has an interior end coupled to the support assembly and an exterior end adapted to held by a user. A projection extends downwardly from the lower plate perpendicular to the handle and adapted to be positioned on one side of a blade to contact the blade when a socket wrench tends to turn a bolt and the blade.

2 Claims, 5 Drawing Sheets

BLADE REMOVING TOOL FOR ROTARY LAWN MOWERS

BACKGROUND OF THE INVENTION

1. Related Application

The present application is an improvement over my earlier application, now U.S. Pat. No. 6,272,724 issued Aug. 14, 2001.

2. Field of the Invention

The present invention relates to a new and improved blade removing tool for rotary lawn mowers and, more particularly, pertains to facilitating the safe and convenient removal of a bolt holding the rotary blade to the motor of a lawn mower.

DESCRIPTION OF THE PRIOR ART

The use of lawn mower tools of known designs and configurations is known in the prior art. More specifically, lawn mower tools of known designs and configurations heretofore devised and utilized for the purpose of changing lawn mower blades through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of Lawn mower tools of known designs and configurations. By way of example, U.S. Pat. No. 4,564,991 to Harold E. Taylor discloses a tool for holding a blade for installation and removal thereof. U.S. Pat. No. 4,736,544 to Lawrence Greenquist discloses a blade holder for sharpening lawn-mower blades. U.S. Pat. No. 4,956,905 to Leonard D. Davidson discloses a tool for holding a rotatable lawn mower blade. Lastly, U.S. Pat. No. 5,865,018 to Todd R. Wanie discloses a cutter blade removal tool.

In this respect, the blade removing tool for rotary lawn mowers according to the present invention substantially departs from the conventional concepts and designs of the prior art, and in doing so provides an apparatus primarily developed for the purpose of facilitating the safe and convenient removal of a bolt holding the rotary blade to the motor of a lawn mower.

Therefore, it can be appreciated that there exists a continuing need for a new and improved blade removing tool for rotary lawn mowers which can be used to facilitate the safe and convenient removal of a bolt holding the rotary blade to the motor of a lawn mower. In this regard, the present invention substantially fulfills this need.

SUMMARY OF THE INVENTION

In view of the foregoing disadvantages inherent in the known types of lawn mower tools of known designs and configurations now present in the prior art, the present invention provides a new and improved blade removing tool for rotary lawn mowers. As such, the general purpose of the present invention, which will be described subsequently in greater detail, is to provide a new and improved blade removing tool for rotary lawn mowers and method which have all the advantages of the prior art and none of the disadvantages.

To attain this, the present invention essentially comprises a lawn mower blade remover. First provided is a blade removing tool for rotary lawn mowers to facilitate the safe and convenient removal of a bolt holding the rotary blade to the motor of a lawn mower. First provided in this embodiment is a central support assembly. The central support assembly has a long horizontal upper plate, a horizontal lower plate. A short horizontal intermediate plate is provided between the upper plate and lower plate. A circular aperture formed in the upper and intermediate plates is in axial alignment and forms a vertical guide through the upper and intermediate plates. The support assembly and apertures form a guide adapted to be positioned over a bolt holding a rotary lawn mower blade in position and to allow the passage of a socket wrench there through for loosening and/or tightening a bolt axially aligned beneath the apertures. Next provided is an elongated handle. The handle has an interior end formed as an extension of the upper plate. The handle also has an exterior end adapted to be held by a user to retain the support assembly against rotation during operation and use. A projection extends downwardly from the upper and lower plates perpendicular to the handle and upper plate. The projection adapted to be positioned on one side of a blade during operation and use to contact the blade when a socket wrench tends to turn a bolt and the blade with resistance being provided by the user through the handle. Finally, a transverse plate is provided. The transverse plate couples the upper plate and handle at the top and the intermediate plate at the bottom for increased stability.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved blade removing tool for rotary lawn mowers which has all the advantages of the prior art lawn mower tools of known designs and configurations and none of the disadvantages.

It is another object of the present invention to provide a so new and improved blade removing tool for rotary lawn mowers which may be easily and efficiently manufactured and marketed.

It is a further object of the present invention to provide a new and improved blade removing tool for rotary lawn mowers which is of a durable and reliable construction.

An even further object of the present invention is to provide a new and improved blade removing tool for rotary lawn mowers which is susceptible of a low cost of manufacture with regard to both materials and labor, and which accordingly is then susceptible of low prices of sale to the consuming public, thereby making such a blade removing tool for rotary lawn mowers economically available to the buying public.

Even still another object of the present invention is to facilitate the safe and convenient removal of a bolt holding the rotary blade to the motor of a lawn mower.

Lastly, it is an object of the present invention to provide a new and improved blade removing tool for rotary lawn mowers including a central support assembly forming a guide adapted to be positioned over a bolt holding a rotary lawn mower blade in position and to allow the passage of a socket wrench there through. An elongated handle has an interior end coupled to the support assembly and an exterior end adapted to held by a user. A projection extends downwardly from the lower plate perpendicular to the handle and adapted to be positioned on one side of a blade to contact the blade when a socket wrench tends to turn a bolt and the blade.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
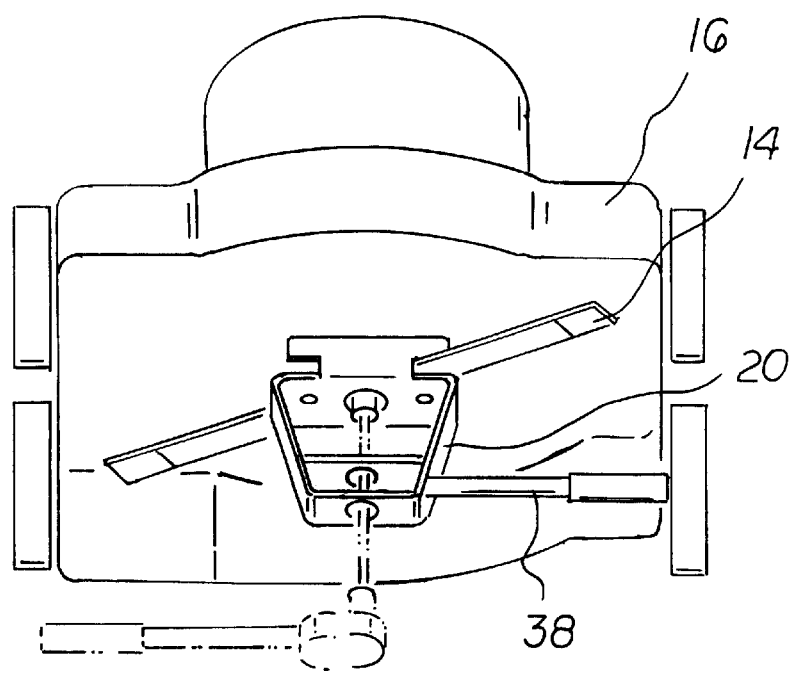
FIG. 1 is a perspective illustration of the preferred embodiment of the blade removing tool for rotary lawn mowers constructed in accordance with the principles of the present invention.
Figure 2:
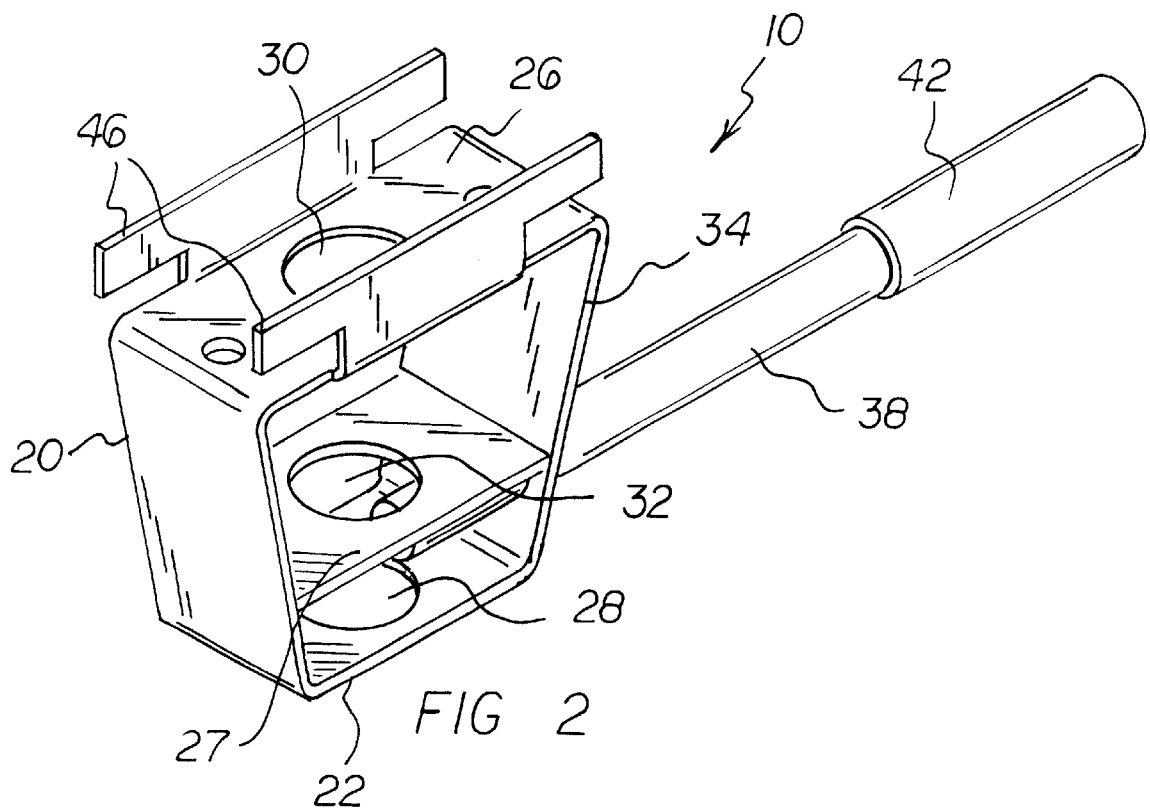
FIG. 2 is a bottom perspective view of the tool as shown in FIG. 1.
Figure 3:
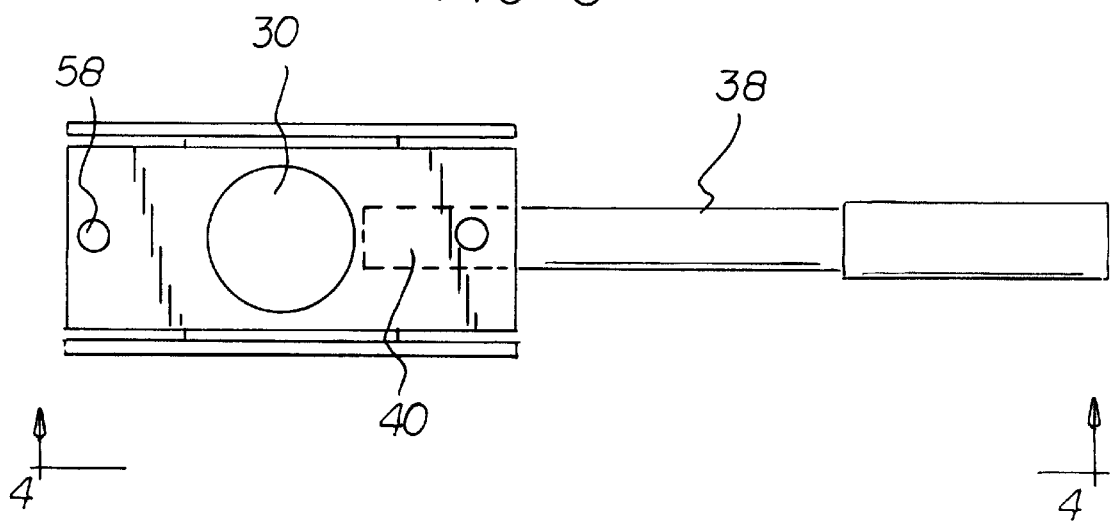
FIG. 3 is a bottom view of the tool shown in the prior figures.
Figure 4:
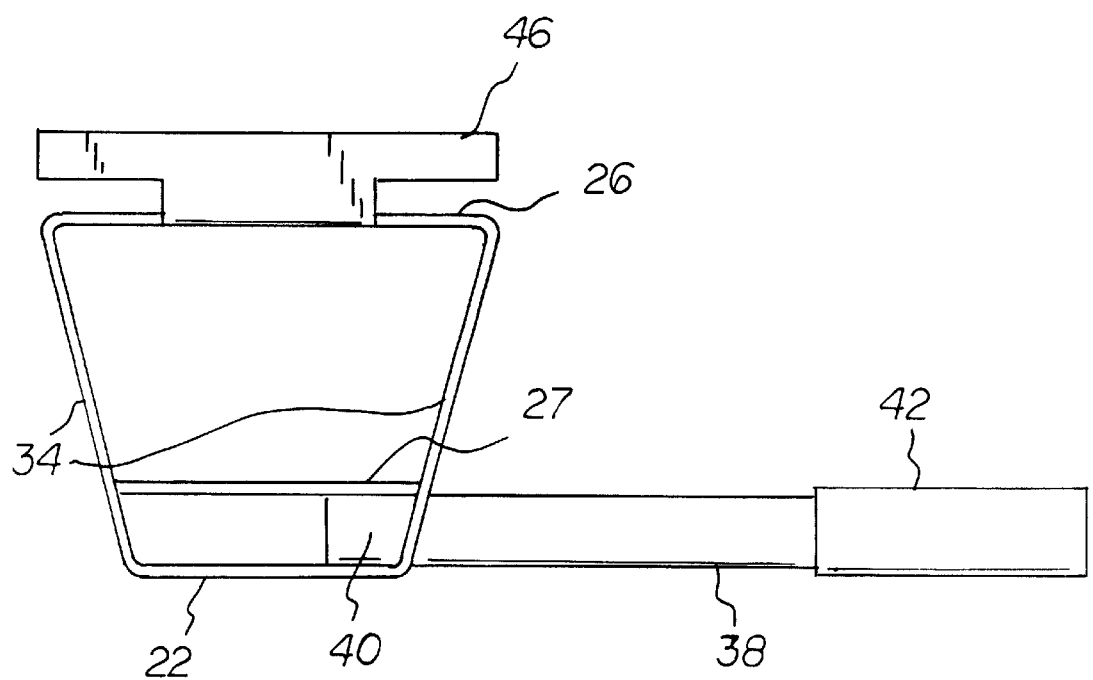
FIG. 4 is a side elevational view taken along line 4—4 of FIG. 3.
Figure 5:
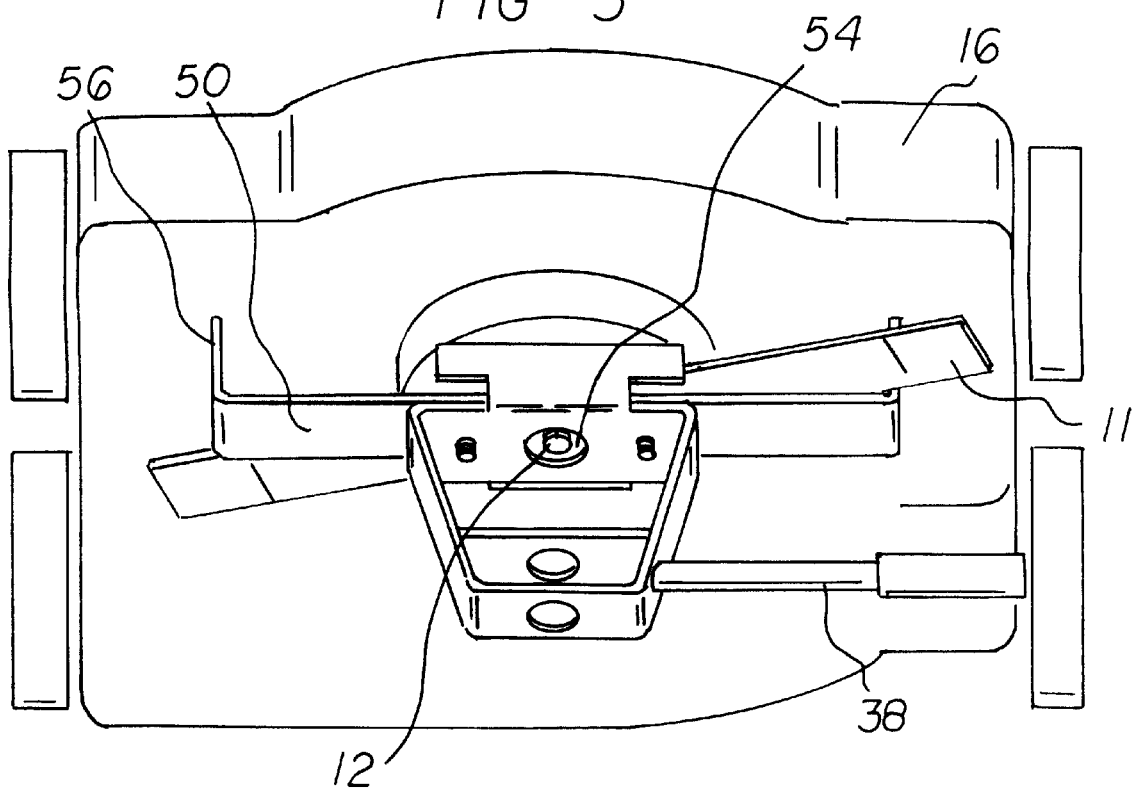
FIG. 5 is a perspective showing of an alternate embodiment of the invention.
Figure 6:
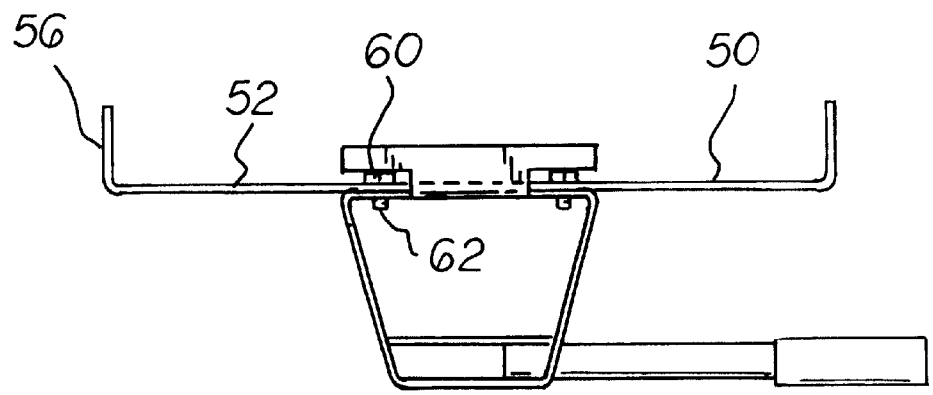
FIG. 6 is a side elevation of the tool shown in FIG. 5.
Figure 7:
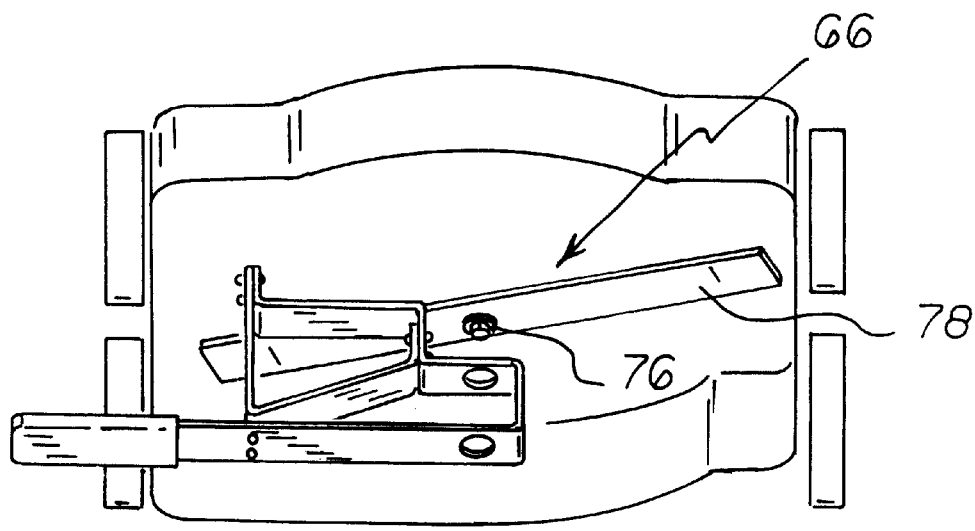
FIG. 7 is a perspective illustration of the final embodiment of the invention.
Figure 8:
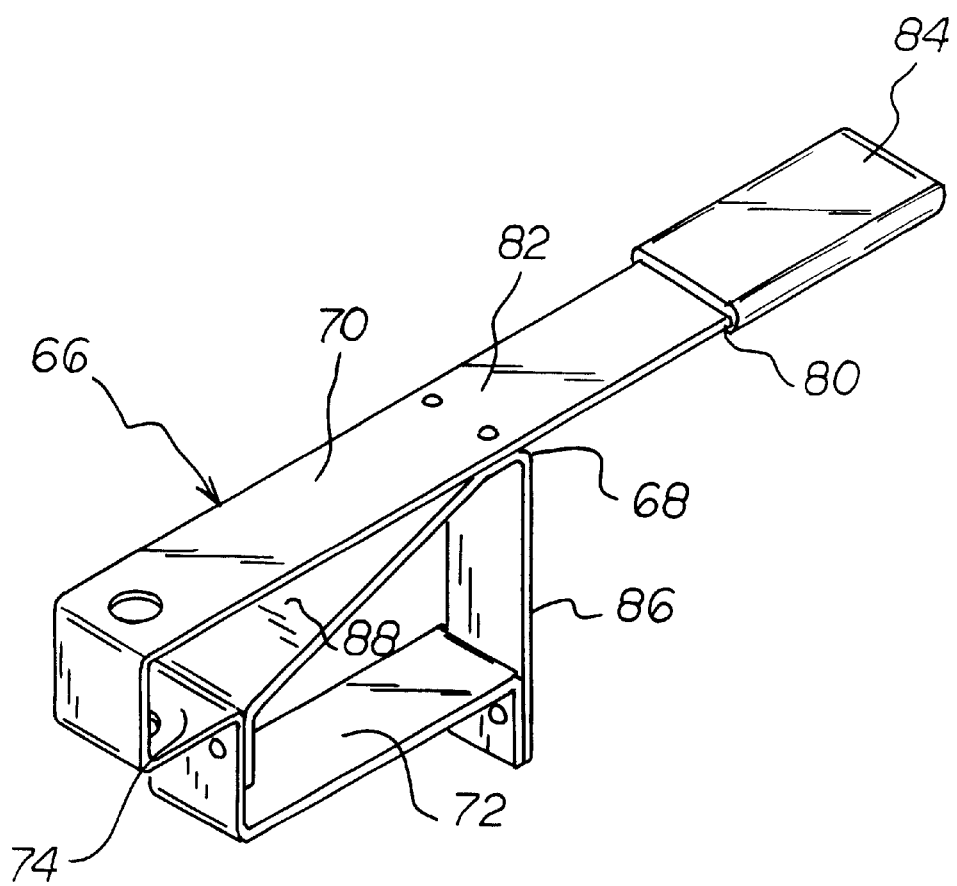
FIG. 8 is an enlarged perspective illustration of the tool of FIG. 7.
Figure 9:
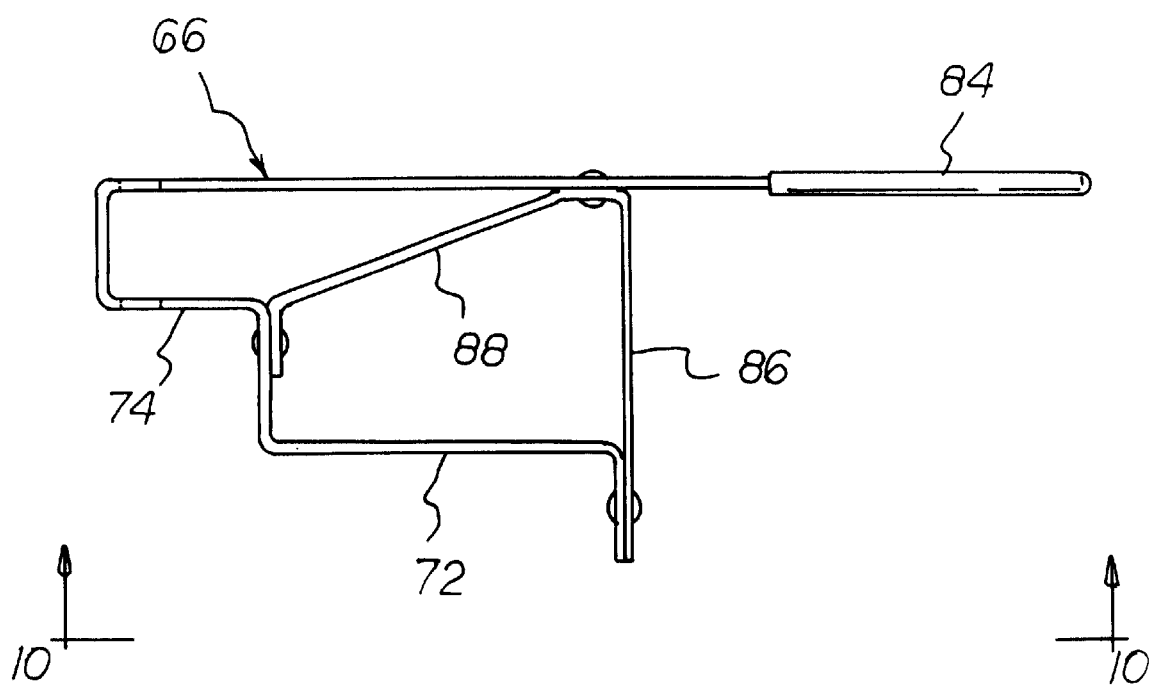
FIG. 9 is a side elevational view of the tool shown in FIGS. 7 and 8.
Figure 10:
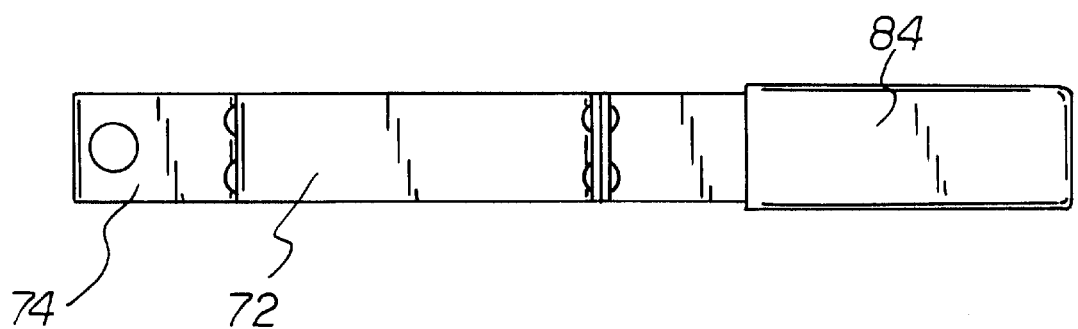
FIG. 10 is a bottom view of the tool taken along line 10—10 of FIG. 9.

With reference now to the drawings, and in particular to FIGS. 1 through 10 thereof, the preferred embodiments of the new and improved blade removing tool for rotary lawn mowers embodying the principles and concepts of the present invention and generally designated by the reference numeral 10 will be described.

The present invention, the new and improved blade removing tool for rotary lawn mowers is a system 10 comprised of a plurality of components. Such components, in their broadest context, include a central support assembly, an elongated handle, a pair of projections and an optional adapter. Each of the individual components is specifically configured and correlated one with respect to the other so as to attain the desired objectives.

First provided is a bolt 12. The bolt holds the rotary blade 14 to the motor of a lawn mower 16. Note FIG. 1 in particular wherein the mower is inverted for working on the blade.

Next provided is a central support assembly 20. The central support assembly has a short horizontal upper plate 22 and a long horizontal lower plate 26. The central support assembly also has a horizontal intermediate plate located between the upper and lower plates. A circular aperture 28, 30, 32 is formed in each of the plates in axial alignment to form a vertical guide through the plates. The assembly has tapering sides plates 34 coupling the horizontal plates together to hold the support assembly in a rigid trapezoidal orientation. The support assembly and apertures form a guide and are adapted to be positioned over a bolt holding a rotary lawn mower blade in position and to allow the passage of a socket wrench through the apertures for loosening and/or tightening a bolt axially aligned beneath the aperture of the lower plate.

An elongated handle is next provided. The elongated handle 38 has an interior end 40 extending through one of the side plates. The elongated handle also has an exterior end 42 adapted to be held by a user. The handle functions to retain the support assembly against rotation during operation and use.

A pair of projections 46, each in an inverted T-shaped configuration, extend downwardly from the lower plate parallel with the handle. The projections are adapted to be positioned on opposite sides of a blade during operation and use to contact the blade when a socket wrench tends to turn a bolt and the blade with resistance being provided by the user through the handle.

An optional adapter 50 is provided. The adapter is formed of an elongated plate 52. The adapter has an upper surface in contact with the lower surface of the lower plate with a central aperture 54 adjacent with the aperture of the lower plate. It also has downwardly extending end sections 56 which are adapted to contact the lawn mower blade during the loosening and/or tightening of the bolt. The end sections extend away from the lower plate a greater distance that the pair of projections. Small apertures 58 are provided in the optional adapter and lower plate. The small apertures are in mutual alignment. Associated bolts 60 extend through the small apertures. Associated nuts 62 are coupled to the bolts to hold the supplemental plate in position.

FIGS. 7 through 10 illustrate the final embodiment of the invention, a blade removing tool for rotary lawn mowers to facilitate the safe and convenient removal of a bolt holding the rotary blade to the motor of a lawn mower. First provided in this embodiment is a central support assembly 68. The central support assembly has a long horizontal upper plate 70, a horizontal lower plate 72. A short horizontal intermediate plate 74 is provided between the upper plate and lower plate. A circular aperture formed in the upper and intermediate plates is in axial alignment and forms a vertical guide through the upper and intermediate plates. The support assembly and apertures form a guide adapted to be positioned over a bolt 76 holding a rotary lawn mower blade 78 in position and to allow the passage of a socket wrench there through for loosening and/or tightening a bolt axially aligned beneath the apertures.

Next provided is an elongated handle 80. The handle has an interior end 82 formed as an extension of the upper plate. The handle also has an exterior end 84 adapted to be held by a user to retain the support assembly against rotation during operation and use.

A projection 86 extends downwardly from the upper and lower plates perpendicular to the handle and upper plate. The projection is adapted to be positioned on one side of a blade during operation and use. The projection contacts the blade when a socket wrench tends to turn a bolt and the blade. Resistance is provided by the user through the handle.

Finally, a transverse plate 88 is provided. The transverse plate couples the upper plate and handle at the top and the intermediate plate at the bottom for increased stability.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A blade removing tool for rotary lawn mowers to facilitate the safe and convenient removal of a bolt holding the rotary blade to the motor of a lawn mower comprising, in combination:

a central support assembly having a long horizontal upper plate, a horizontal lower plate and a short horizontal intermediate plate there between, with a circular aperture formed in the upper and intermediate plates in axial alignment to form a vertical guide there through, the support assembly and apertures forming a guide adapted to be positioned over a bolt holding a rotary lawn mower blade in position and to allow the passage of a socket wrench there through for loosening and/or tightening a bolt axially aligned beneath the apertures;

an elongated handle having an interior end formed as an extension of the upper plate and an exterior end adapted to be held by a user to retain the support assembly against rotation during operation and use;

a projection extending downwardly from the upper and lower plates perpendicular to the handle and upper plate and adapted to be positioned on one side of a blade during operation and use to contact the blade when a socket wrench tends to turn a bolt and the blade with resistance being provided by the user through the handle; and a transverse plate coupling the upper plate and handle at the top and the intermediate plate at the bottom for increased stability.

2. A blade removing tool for rotary lawn mowers comprising:

a central support assembly having a lower plate and forming a guide, adapted to be positioned over a bolt holding a rotary lawn mower blade in position and to allow the passage of a socket wrench there through;

an elongated handle having an interior end coupled to the support assembly and an exterior end adapted to be held by a user;

a projection extending downwardly from the lower plate perpendicular to the handle and adapted to be positioned on one side of a blade to contact the blade when a socket wrench tends to turn a bolt and the blade; and an upper plate and an intermediate plate and a transverse plate, the transverse plate coupling the upper plate and the intermediate plate and the handle for increased stability of the tool during use.

* * * * *